US012799357B2

(12) United States Patent
Tsuchida

(10) Patent No.: US 12,799,357 B2
(45) Date of Patent: Nov. 17, 2026

(54) CURABLE COATING COMPOSITION AND ARTICLE

(71) Applicant: SHIN-ETSU CHEMICAL CO., LTD., Tokyo (JP)

(72) Inventor: Kazuhiro Tsuchida, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 708 days.

(21) Appl. No.: 18/266,195

(22) PCT Filed: Dec. 2, 2021

(86) PCT No.: PCT/JP2021/044209
§ 371 (c)(1),
(2) Date: Jun. 8, 2023

(87) PCT Pub. No.: WO2022/130993
PCT Pub. Date: Jun. 23, 2022

(65) Prior Publication Data

US 2023/0357596 A1 Nov. 9, 2023

(30) Foreign Application Priority Data

Dec. 17, 2020 (JP) ................................ 2020-208936

(51) Int. Cl.
*C09D 183/04* (2006.01)
*C08G 77/08* (2006.01)
*C08G 77/16* (2006.01)
*C08G 77/20* (2006.01)
*C08G 77/46* (2006.01)
*C08G 77/50* (2006.01)
(Continued)

(52) U.S. Cl.
CPC .......... *C09D 183/04* (2013.01); *C08G 77/08* (2013.01); *C08G 77/16* (2013.01); *C08G 77/20* (2013.01); *C08G 77/50* (2013.01); *C08K 5/0025* (2013.01); *C08K 5/17* (2013.01); *C09D 5/00* (2013.01); *C09D 7/63* (2018.01); *C08G 77/46* (2013.01)

(58) Field of Classification Search
CPC .......... C09D 183/04; C09D 7/63; C09D 5/00; C09D 183/12; C08G 77/08; C08G 77/16; C08G 77/46; C08G 77/20; C08G 77/50; C08G 77/18; C08K 5/0025; C08K 5/17; C08K 5/057; C08L 83/00
See application file for complete search history.

(56) References Cited

U.S. PATENT DOCUMENTS

| | | | |
|---|---|---|---|
| 3,976,676 | A | 8/1976 | Lohse et al. |
| 5,464,901 | A | 11/1995 | Yoshikawa et al. |

(Continued)

FOREIGN PATENT DOCUMENTS

| | | | |
|---|---|---|---|
| CN | 104419234 | A | 3/2015 |
| CN | 108603075 | A | 9/2018 |

(Continued)

OTHER PUBLICATIONS

Sep. 26, 2023 Office Action issed in Japanese Patent Application No. 2020-208936.

(Continued)

*Primary Examiner* — Marc S Zimmer
*Assistant Examiner* — Virginia L Stonehocker
(74) *Attorney, Agent, or Firm* — Oliff PLC

(57) ABSTRACT

A curable coating composition including: (A) organopolysiloxane represented by general formula (1), $$R^1_aR^2_bR^3_cSiO_{(4-a-b-c)/2} \quad (1)$$

wherein $R^1$ represents alkyl group, etc., $R^2$ represents hydroxy group, alkoxy group, etc., and $R^3$ represents silicone compound residue represented by general formula (4), (4)

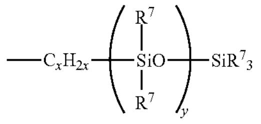

wherein $R^7$ represents alkyl group, etc., x is integer of 1≤x≤5, and y is integer of 0≤y≤500, "a" is number of 1.0≤a≤2.5, "b" is number of 0.001≤b≤1.5, and "c" is number of 0≤c≤1.5; (B) polysiloxanediol represented by general formula (5) and/or alkoxy equivalent thereof, (5)

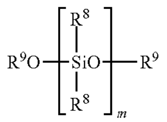

wherein $R^8$ represents alkyl group, etc., $R^9$ represents hydrogen atom, methyl group, or ethyl group, and "m" is integer of 4≤m≤50; and (C) condensation curing catalyst. This provides organopolysiloxane-containing composition for coating to yield cured product that achieves hardness and bending resistance, and has appearance of low friction on coated surface, good touch feel, and excellent safety.

16 Claims, No Drawings

(51) Int. Cl.

| | |
|---|---|
| ***C08K 5/00*** | (2006.01) |
| ***C08K 5/17*** | (2006.01) |
| ***C09D 5/00*** | (2006.01) |
| ***C09D 7/63*** | (2018.01) |

(56) References Cited

U.S. PATENT DOCUMENTS

| | | | | |
|---|---|---|---|---|
| 6,660,281 | B1 | 12/2003 | Nakanishi et al. | |
| 9,683,130 | B2 | 6/2017 | Dooley | |
| 2005/0202257 | A1 | 9/2005 | Gerritsen et al. | |
| 2006/0210506 | A1 * | 9/2006 | Kamei | A61K 8/894 424/70.122 |
| 2017/0210913 | A1 | 7/2017 | Dubey et al. | |
| 2020/0270285 | A1 | 8/2020 | Yamada et al. | |

FOREIGN PATENT DOCUMENTS

| | | | | |
|---|---|---|---|---|
| CN | 111315834 | A | 6/2020 | |
| CN | 111607091 | A | 9/2020 | |
| JP | H01-254775 | A | 10/1989 | |
| JP | H06-271650 | A | 9/1994 | |
| JP | 2001-072891 | A | 3/2001 | |
| JP | 2002-327115 | A | 11/2002 | |
| JP | 2008-095002 | A | 4/2008 | |
| JP | 2010-059298 | A | 3/2010 | |
| JP | 2019-507213 | A | 3/2019 | |
| KR | 10-2019-0129206 | A | 11/2019 | |
| KR | 1020190127148 | A | 11/2019 | |
| KR | 1020200006442 | A | 1/2020 | |
| WO | 2004/091562 | A1 | 10/2004 | |
| WO | WO-2019190776 | A1 * | 10/2019 | C08L 83/04 |

OTHER PUBLICATIONS

May 30, 2024 Search Report issued in Chinese Patent Application No. 202180083645.4.

Hongmei, Lu et al., "Application of Silicone in Coating Industry", Silicone Material, 2002, vol. 16, No. 06, pp. 22-27.

Taniguchi, Takashi et al., "Preparation of Flexible Polysiloxane-Type Hard Coating Material", Kobunshi Ronbunshu, 2010, vol. 67, No. 02, pp. 68-75.

Guoqiang, Xu et al., "Heavy-Duty corrosion resistant Polysiloxane Coatings", Paint & Coatings Industry, 2004, vol. 34, No. 08, pp. 58-63.

Dec. 29, 2023 Office Action issued in Chinese Patent Application No. 202180083645.4.

Oct. 18, 2024 Extended European Search Report issued in European Patent Application No. 21906356.7.

Zhu et al., "Polymeric Materials Science and Engineering," Proceedings of the American Chemical Society Division of Polymeric Materials: Science and Engineering, 1998, vol. 79, pp. 192-193.

Mar. 1, 2022 International Search Report issued in International Patent Application No. PCT/JP2021/044209.

Jun. 13, 2023 International Preliminary Report on Patentability issued in International Patent Application No. PCT/JP2021/044209.

* cited by examiner

CURABLE COATING COMPOSITION AND ARTICLE

TECHNICAL FIELD

The present invention relates to an organopolysiloxane-containing curable coating composition.

BACKGROUND ART

A silicone resin has excellent characteristics such as water repellency, heat resistance, weather resistance, cold resistance, electrical insurability, chemical resistance, and safety to a body. Thus, the silicone resin is widely used in various fields at present.

In particular, an organopolysiloxane having a three-dimensional crosslinked structure mainly composed of a $SiO_{4/2}$ unit (Q unit) and $RSiO_{3/2}$ unit (T unit) (R represents an organic group such as an alkyl group or a phenyl group) is called as a silicone resin or a silicone alkoxy oligomer, and widely used for a paint and a coating agent, and use for a binder with utilizing its curability.

Among these, a liquid silicone alkoxy oligomer having an alkoxysilyl group as a crosslinking group is used as a main component of a solvent-free paint, which does not contain a flammable organic solvent harmful to a human body (Non Patent Document 1).

In addition, since this alkoxysilyl group proceeds hydrolysis and dehydrative condensation crosslinking reactions at a normal temperature with moisture in air, the silicone-alkoxy oligomer containing the alkoxysilyl group with a blended curing catalyst enables the alkoxysilyl group to react at a normal temperature to form a siloxane network. Such a polysiloxane cured film, which has excellent heat resistance and weather resistance, is widely used in fields from outdoor constructions to electronic parts.

Furthermore, the silicone alkoxy oligomer proceeds the curing reaction even at a room temperature as noted above, but the reaction can be promoted by heating. It can be mentioned that the silicone alkoxy oligomer, introducing a heat-curing step as necessary based on its use, is a technique having excellent coating applicability.

Such a silicone resin or silicon alkoxy oligomer has advantages of good curability and high surface hardness derived from its three-dimensional crosslinking structure, but meanwhile, lacks flexibility and bending resistance due to its high crosslinking density, and has problems of cracking on the coating film over time after forming the film or when external stress is applied.

To improve this flexibility and bending resistance, commonly applied is a method of incorporating a diorganosiloxane ($R_2SiO_{2/2}$) unit (D unit) during synthesis of the silicone resin or silicone alkoxy oligomer. In this case, however, the D unit is randomly incorporated in the structure, and thus many D units are necessarily added in order to impart the flexibility, resulting in a problem of deteriorating the excellent curability and surface hardness, which are the advantages of the silicone resin.

In addition, a method of adding a silicone oil blocked at both molecular terminals with TEOS ($Si(OCH_2CH_3)_4$) is also proposed (Non Patent Document 1). However, such a silicone oil has poor compatibility with the silicone resin or the silicone alkoxy oligomer, and causes cloudiness and repellency of the coating film.

Art of introducing the alkoxysilyl group into a linear silicone with a silethylene group can be performed by using a hydrosilylation reaction, and is known publicly (Patent Documents 1 and 2). Patent Document 1 discloses an organopolysiloxane compound obtained by a hydrosilylation reaction between: a methyl/phenyl side chain type silicone oil compound having a hydrosilyl group and composed of a chain structure of the D unit; and a silicone alkoxy oligomer compound having both of an olefin and an alkoxysilyl group on the side chain. The organopolysiloxane compound has both of a silicone alkoxy oligomer structure having an alkoxysilyl group and a structure derived from the methyl/phenyl side chain type silicone oil structure in one molecule.

This organopolysiloxane compound in Patent Document 1 has the methyl/phenyl side chain type silicone oil structure having a relatively long chain and high molecular weight, and thereby exhibits the effect when added as a cracking-resistance imparting agent. In this case, however, the hardness is insufficient when the compound alone is cured, and it is difficult to use it alone for a paint and a coating agent. The art in Patent Document 2 emphasizes a point for aiming improvement of touch feel with the linear silicone such as a hair treatment, and is silent on application as the flexible coating material.

Patent Document 3 discloses that a silicone having a branched organopolysiloxane's side chain modified with a long-chain alkyl group, an oxyalkylene group, a trialkoxysilyl group, etc. is used for a powder surface-treating agent of cosmetics. However, the use as the coating component is not described nor suggested therein.

CITATION LIST

Patent Literature

Patent Document 1: JP H06-271650 A
Patent Document 2: WO 2004/091562
Patent Document 3: JP 2001-72891 A

Non Patent Literature

Non Patent Document 1: Polymeric Materials Science and Engineering, 1998, Vol. 79, 192

SUMMARY OF INVENTION

Technical Problem

The present invention has been made in view of the above circumstances. An object of the present invention is to provide an organopolysiloxane-containing composition for a coating to yield a cured product that achieves both of hardness and bending resistance, and that yields appearance of low friction on a coated surface, good touch feel and excellent safety.

Solution to Problem

To achieve the above object, the present invention provides a curable coating composition comprising the following components (A) to (C):

(A) an organopolysiloxane represented by the following general formula (1), $$R^1_aR^2_bR^3_cSiO_{(4-a-b-c)/2} \quad (1)$$

wherein $R^1$ represents an organic group selected from a group consisting of an alkyl group having 1 to 30 carbon atoms, a cycloalkyl group having 5 to 10 carbon atoms, an aryl group having 6 to 10 carbon atoms, an aralkyl group having 7 to 14 carbon atoms, a fluorine-substituted alkyl group having 3 to 10 carbon atoms, and an organic group represented by the following general formula (2), $$—C_dH_{2d}—O—(C_2H_4O)_e—(C_3H_6O)_f—R^4 \quad (2)$$

wherein $R^4$ represents an alkyl group having 1 to 30 carbon atoms or an acyl group having 1 to 30 carbon atoms; "d" is an integer of $0 \le d \le 15$, "e" is an integer of $0 \le e \le 50$, and "f" is an integer of $0 \le f \le 50$, wherein $R^2$ represents a group selected from a hydroxy group, an alkoxy group having 1 to 6 carbon atoms, and the following general formula (3),

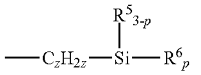

(3)

wherein $R^5$ represents a group selected from a group consisting of an alkyl group having 1 to 6 carbon atoms, a cycloalkyl group having 5 to 6 carbon atoms, and a phenyl group; $R^6$ represents an alkoxy group having 1 to 6 carbon atoms; "z" is an integer of 2 to 8; and "p" is an integer of 1 to 3, wherein $R^3$ represents a silicone compound residue represented by the following general formula (4),

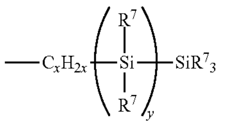

(4)

wherein $R^7$ independently represents a group selected from a group consisting of an alkyl group having 1 to 30 carbon atoms, a cycloalkyl group having 5 to 10 carbon atoms, an aryl group having 6 to 10 carbon atoms, an aralkyl group having 7 to 14 carbon atoms, and a fluorine-substituted alkyl group having 3 to 10 carbon atoms; "x" is an integer of $1 \le x \le 5$; and "y" is an integer of $0 \le y \le 500$, wherein when a plurality of the $R^1$ to $R^7$ are contained in a molecule, the $R^1$ to $R^7$ are optionally the same with or different from each other; "a" is a number of $1.0 \le a \le 2.5$; "b" is a number of $0.001 \le b \le 1.5$; and "c" is a number of $0 \le c \le 1.5$;

(B) a polysiloxanediol represented by the following general formula (5) and/or an alkoxy equivalent thereof,

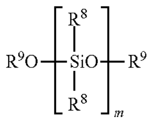

(5)

wherein $R^8$ independently represents a group selected from a group consisting of an alkyl group having 1 to 30 carbon atoms, a cycloalkyl group having 5 to 10 carbon atoms, an aryl group having 6 to 10 carbon atoms, an aralkyl group having 7 to 14 carbon atoms, and a fluorine-substituted alkyl group having 3 to 10 carbon atoms, each of which optionally has a substituent; $R^9$ independently represents a hydrogen atom, a methyl group, or an ethyl group; and "m" is an integer of $4 \le m \le 50$; and (C) a condensation curing catalyst.

Such a composition can be an organopolysiloxane-containing composition for a coating to yield a cured product that achieves both of hardness and bending resistance, and that yields appearance of low friction on a coated surface, good touch feel and excellent safety.

A weight average molecular weight of the component (A) measured in terms of polystyrene by gel permeation chromatography is preferably 300 to 100,000.

Such a component (A) yields a composition without tackiness, and a coated film formed from the composition has sufficient surface smoothness and water slippability.

The component (C) is preferably one or more kinds selected from a group consisting of an acid catalyst, an amine compound and a salt thereof, an aminoalkyl-group-substituted alkoxysilane, and an aluminum-based, titanium-based, and tin-based organometallic catalyst.

For the inventive curable coating composition, such a condensing curing catalyst can be used.

The inventive curable coating composition preferably further comprises (D) an organic solvent.

Containing the organic solvent can regulate the viscosity for better operability and achieve storage stability of the composition.

The present invention also provides an article having a cured film of the above curable coating composition.

The inventive curable coating composition can be suitably used for coating an article.

Advantageous Effects of Invention

The inventive curable coating composition comprising the organopolysiloxane has a linear silicone being a film constituent as an essential structure. Furthermore, since having an alkoxysilyl group or silanol group having hydrolytic condensation ability, the inventive curable coating composition has cured-film formability with the siloxane condensation crosslinking. In addition, since the organopolysiloxane used in the present invention has excellent compatibility with other silicone components by the silicone branched chain in its structure, a silicone functionalized at both terminals can be optionally introduced into the inventive curable coating composition, resulting in easy balance regulation between the film hardness and the flexibility. Furthermore, the present invention contributes to improvement of touch feel, water repellency, and water slippability derived from the linear silicone structure having a low surface tension. Therefore, the present invention can provide an organopolysiloxane-containing composition for a coating that achieves both of the hardness and the bending resistance, and that yields appearance of low friction on a coated surface, good touch feel and excellent safety.

The inventive curable coating composition, which has such characteristics, can be suitable for use imparting durability and a certain degree of hardness to a substrate to be bent a plurality of times or use requiring water repellency and touch feel on a coating surface.

DESCRIPTION OF EMBODIMENTS

As noted above, there have been needs for development of an organopolysiloxane-containing composition for a coating that achieves both of hardness and bending resistance, and that yields appearance of low friction on a coated surface, good touch feel and excellent safety.

The present inventors have made earnestly study to solve the above problem, and consequently found that a hydrolytic-condensation cured film containing: an organopolysiloxane in which an alkoxysilyl group is introduced into a linear silicone main chain via a silethylene structural group; and an organopolysiloxane having a dimethylsilanol group or a dimethylalkoxy group at both terminals of a linear silicone, as essential constituents can impart desired characteristics. This finding has led to make the present invention completed.

Specifically, the present invention is a curable coating composition comprising the following components (A) to (C):

(A) an organopolysiloxane represented by the following general formula (1), $$R^1_aR^2_bR^3_cSiO_{(4-a-b-c)/2} \quad (1)$$

wherein $R^1$ represents an organic group selected from a group consisting of an alkyl group having 1 to 30 carbon atoms, a cycloalkyl group having 5 to 10 carbon atoms, an aryl group having 6 to 10 carbon atoms, an aralkyl group having 7 to 14 carbon atoms, a fluorine-substituted alkyl group having 3 to 10 carbon atoms, and an organic group represented by the following general formula (2), $$-C_dH_{2d}-O-(C_2H_4O)_e-(C_3H_6O)_f-R^4 \quad (2)$$

wherein $R^4$ represents an alkyl group having 1 to 30 carbon atoms or an acyl group having 1 to 30 carbon atoms; "d" is an integer of $0 \le d \le 15$, "e" is an integer of $0 \le e \le 50$, and "f" is an integer of $0 \le f \le 50$, wherein $R^2$ represents a group selected from a hydroxy group, an alkoxy group having 1 to 6 carbon atoms, and the following general formula (3), (3)

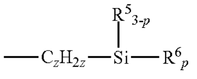

wherein $R^5$ represents a group selected from a group consisting of an alkyl group having 1 to 6 carbon atoms, a cycloalkyl group having 5 to 6 carbon atoms, and a phenyl group; $R^6$ represents an alkoxy group having 1 to 6 carbon atoms; "z" is an integer of 2 to 8; and "p" is an integer of 1 to 3, wherein $R^3$ represents a silicone compound residue represented by the following general formula (4), (4)

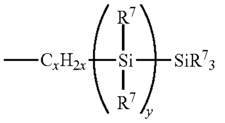

wherein $R^7$ independently represents a group selected from a group consisting of an alkyl group having 1 to 30 carbon atoms, a cycloalkyl group having 5 to 10 carbon atoms, an aryl group having 6 to 10 carbon atoms, an aralkyl group having 7 to 14 carbon atoms, and a fluorine-substituted alkyl group having 3 to 10 carbon atoms; "x" is an integer of $1 \le x \le 5$; and "y" is an integer of $0 \le y \le 500$, wherein when a plurality of the $R^1$ to $R^7$ are contained in a molecule, the $R^1$ to $R^7$ are optionally the same with or different from each other; "a" is a number of $1.0 \le a \le 2.5$; "b" is a number of $0.001 \le b \le 1.5$; and "c" is a number of $0 \le c \le 1.5$;

(B) a polysiloxanediol represented by the following general formula (5) and/or an alkoxy equivalent thereof, (5)

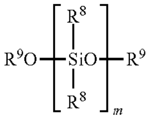

wherein $R^8$ independently represents a group selected from a group consisting of an alkyl group having 1 to 30 carbon atoms, a cycloalkyl group having 5 to 10 carbon atoms, an aryl group having 6 to 10 carbon atoms, an aralkyl group having 7 to 14 carbon atoms, and a fluorine-substituted alkyl group having 3 to 10 carbon atoms, each of which optionally has a substituent; $R^9$ independently represents a hydrogen atom, a methyl group, or an ethyl group; and "m" is an integer of $4 \le m \le 50$; and (C) a condensation curing catalyst.

Hereinafter, the present invention will be described in detail, but the present invention is not limited thereto.

(A) Organopolysiloxane

The organopolysiloxane of the component (A) according to the present invention is represented by the following general formula (1).

$$R^1_aR^2_bR^3_cSiO_{(4-a-b-c)/2} \quad (1)$$

Here, in the general formula (1), $R^1$ represents an organic group selected from a group consisting of an alkyl group having 1 to 30 carbon atoms, a cycloalkyl group having 5 to 10 carbon atoms, an aryl group having 6 to 10 carbon atoms, an aralkyl group having 7 to 14 carbon atoms, a fluorine-substituted alkyl group having 3 to 10 carbon atoms, and an organic group represented by the following general formula (2). $R^1$ preferably represents an alkyl group having 1 to 6 carbon atoms, a fluorine-substituted alkyl group having 3 to 6 carbon atoms, or the organic group represented by the following general formula (2).

$$-C_dH_{2d}-O-(C_2H_4O)_e-(C_3H_6O)_f-R^4 \quad (2)$$

Here, in the general formula (2), $R^4$ represents an alkyl group having 1 to 30 carbon atoms or an acyl group having 1 to 30 carbon atoms, and preferably an alkyl group having 7 to 30 carbon atoms. "d" is an integer of $0 \le d \le 15$ and preferably $2 \le d \le 10$, "e" is an integer of $0 \le e \le 50$, and "f" is an integer of $0 \le f \le 50$. Note that "d", "e", and "f" preferably does not represent 0 simultaneously.

Examples of the $R^1$ include organic groups represented by: alkyl groups, such as a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an eicosyl group; cycloalkyl groups, such as a cyclopentyl group and a cyclohexyl group; aryl groups, such as a phenyl group and a tolyl group; aralkyl groups, such as a benzyl group and a phenethyl group; and fluorine-substituted alkyl groups, such as a trifluoropropyl group and a heptadecafluorodecyl group. The $R^1$ preferably represents a methyl group, an octyl group, a decyl group, a dodecyl group, a phenyl group, and a trifluoropropyl group.

The alkyl group may be used singly, or may be used in combination of two or more kinds thereof. When two or more kinds thereof is used in combination, a short-chain alkyl group having 1 to 4 carbon atoms and a long-chain alkyl group having 8 or more carbon atoms are preferably used in combination.

$R^1$ also preferably represents the organic group represented by the general formula (2). Examples thereof include: alkylene alkyl ether groups; residues of higher alcohols, such as oleoyl alcohol, cetyl alcohol, oleyl alcohol, and stearyl alcohol, and polyoxyalkylene adducts thereof; higher alcohol alkenyl ether residues and polyoxyalkylene adducts thereof; residues of fatty acids, such as oleic acid, stearic acid, and behenic acid, or polyoxyalkylene adducts thereof, or fatty acid alkenyl ether adducts and polyoxyalkylene adducts thereof.

That is, when d=1, the general formula (2) is $-CH_2-O-(C_2H_4O)_e(C_3H_6O)_fR^4$, and furthermore, when e=0 and f=0, the general formula (2) is $-CH_2-O-R^4$. Here, when $R^4$ represents an alkyl group having 1 to 10 carbon atoms, the alkylene alkyl ether groups are included. When d=0, the general formula (2) is $-O-(C_2H_4O)_e(C_3H_6O)_fR^4$, and furthermore, when e=0 and f=0, the general formula (2) is $-O-R^4$. Here, when $R^4$ represents an alkyl group having 7 to 30 carbon atoms, the residues of higher alcohols, such as cetyl alcohol, oleyl alcohol, and stearyl alcohol, are included. When $R^4$ represents an acyl group having 1 to 30 carbon atoms, the fatty acid residues are included.

When "d" represents 3 or more, the general formula (2) is $-C_dH_{2d}-O-(C_2H_4O)_e(C_3H_6O)_fR^4$ ($d \ge 3$), and includes: the alkenyl ether or alkenyl ester residues of the higher alcohols or fatty acids; and alkylene oxide adduct residues thereof. These groups can be introduced into the organopolysiloxane by, for example: a dehydrogenation reaction between a hydrosilyl group in an organohydrogenpolysiloxane and a higher alcohol; or an addition reaction between a hydrosilyl group and the alkenyl ether or ester.

$R^2$ represents a group selected from a hydroxy group, an alkoxy group having 1 to 6 carbon atoms, or the following general formula (3).

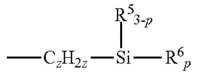

(3)

Here, in the general formula (3), $R^5$ represents a group selected from a group consisting of an alkyl group having 1 to 6 carbon atoms, a cycloalkyl group having 5 to 6 carbon atoms, and a phenyl group; $R^6$ represents an alkoxy group having 1 to 6 carbon atoms; "z" represents an integer of 2 to 8; and "p" represents an integer of 1 to 3, preferably 2 or 3.

Specific examples of the $-SiR^5_{3-p}R^6_p$ part in the general formula (3) include a dimethylmethoxysilyl group, a dimethoxymethylsilyl group, a trimethoxysilyl group, a dimethylethoxysilyl group, diethoxymethylsilyl group, and a triethoxysilyl group, and more preferably a trimethoxysilyl group and a triethoxysilyl group. The group represented by the general formula (3) can be introduced into the organohydropolysiloxane skeleton by, for example, an addition reaction of a vinylsilane in which a vinyl group is bonded to the above silyl group into a hydrosilyl group.

$R^3$ represents a silicone compound residue represented by the following general formula (4).

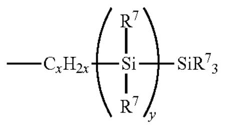

(4)

Here, in the general formula (4), $R^7$ independently represents a group selected from a group consisting of an alkyl group having 1 to 30 carbon atoms, a cycloalkyl group having 5 to 10 carbon atoms, an aryl group having 6 to 10 carbon atoms, an aralkyl group having 7 to 14 carbon atoms, and a fluorine-substituted alkyl group having 3 to 10 carbon atoms. $R^7$ preferably represents an alkyl group having 1 to 6 carbon atoms. "x" is an integer of $1 \le x \le 5$, and preferably 2 or 3. "y" is an integer of $0 \le y \le 500$, preferably $3 \le y \le 100$, and more preferably $1 \le y \le 15$. "y" of more than 500 may cause a problem such as deterioration in reactivity with the hydrogensiloxane part of the main chain.

Specific examples of the $R^7$ include: alkyl groups, such as a methyl group, an ethyl group, a propyl group, a butyl group, a pentyl group, a hexyl group, a heptyl group, an octyl group, a nonyl group, and a decyl group; cycloalkyl groups, such as a cyclopentyl group and a cyclohexyl group; aryl groups, such as a phenyl group and a tolyl group; aralkyl groups, such as a benzyl group and a phenethyl group; and fluorine-substituted alkyl groups, such as a trifluoropropyl group and a heptadecafluorodecyl group. $R^7$ preferably represents a methyl group, an ethyl group, a phenyl group, and a trifluoropropyl group.

When a plurality of $R^1$ to $R^7$ is included in the molecule, they are optionally same with or different from each other. In the general formula (1), "a" is $1.0 \le a \le 2.5$, and preferably $1.2 \le a \le 2.3$. "b" is $0.001 \le b \le 1.5$, and preferably $0.05 \le b \le 1.0$. "c" represents a number of $0 \le c \le 1.5$, preferably $0.001 \le c \le 1.5$, and more preferably $0.05 \le c \le 1.0$. If "b" is less than 0.001, the number of crosslinking reaction points with the (B) polysiloxanediol and/or an alkoxy equivalent thereof, described later, becomes insufficient, leading to insufficient cured-film formability. If "b" is more than 1.5, the number of crosslinking reaction points with the component (B) becomes excessive, leading to a hard and brittle cured film. If "c" is more than 1.5, the component (A) becomes too bulky and the reaction with the component (B) may not sufficiently proceed.

The organopolysiloxane compound represented by the general formula (1) can be synthesized by, for example, an addition reaction and/or a dehydrogenation reaction between: an organopolysiloxane having a hydrosilyl group; and an alkenyl ether or alkenyl ester of a higher alcohol or fatty acid, or an alkylene oxide adduct thereof, or a higher alcohol; an alkenyl compound such as, for example, vinyltrichlorosilane, vinyltrimethoxysilane, and vinyltriethoxysilane; and a silicone having a vinyl group or an alkenyl group at one silicone terminal, in the presence of a platinum catalyst or a rhodium catalyst.

The organopolysiloxane compound represented by the general formula (1) preferably has a kinematic viscosity of 10 to 1,000 $mm^2/s$, and particularly preferably 30 to 300 $mm^2/s$. The weight average molecular weight thereof is preferably 300 to 100,000, and particularly preferably 1,000 to 10,000. When the values of the kinematic viscosity and weight average molecular weight are lower than or equal to the above upper limits, the organopolysiloxane compound has appropriate viscidity, and does not cause texture such as tackiness. Meanwhile, when the values thereof are more than or equal to the above lower limits, the surface smoothness and water slippability, which are the features of the organopolysiloxane compound, can be sufficiently obtained.

Note that, the kinematic viscosity in the present invention is a value measured at 25° C. with a Cannon-Fenske viscometer in accordance with a method described in JIS Z 8803:2011. The weight average molecular weight is a value determined by gel permeation chromatography (GPC) measured under the following conditions in terms of polystyrene having a known molecular weight as a standard substance.

Measurement Condition

Developing solvent: Tetrahydrofuran (THF)

Flow rate: 0.6 mL/min

Detector: Refractive index detector (RI)

Column: TSK Guardcolumn SuperH-H

TSKgel SuperHM-N (6.0 mmI.D.×15 cm×1)

TSKgel SuperH2500 (6.0 mmI.D.×15 cm×1)

(All the above are manufactured by Tosoh Corporation.)

Column temperature: 40° C.

Injection amount of sample: 50 μL (THF solution at a concentration of 0.3 mass %)

The organopolysiloxane of the component (A) may be synthesized by a known method, or a commercially available product may be used. Specific examples of the commercially available product include KF-9908 and KF-9909, manufactured by Shin-Etsu Chemical Co., Ltd.

(B) Polysiloxanediol and/or Alkoxy Equivalent Thereof

The polysiloxanediol and/or an alkoxy equivalent thereof (B) according to the present invention is represented by the following general formula (5).

(5)

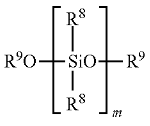

In the general formula (5), $R^8$ represents a group selected from a group consisting of an alkyl group having 1 to 30 carbon atoms, a cycloalkyl group having 5 to 10 carbon atoms, an aryl group having 6 to 10 carbon atoms, an aralkyl group having 7 to 14 carbon atoms, and a fluorine-substituted alkyl group having 3 to 10 carbon atoms. $R^8$ is optionally same with or different from each other, and optionally has a substituent. $R^8$ preferably represents a methyl group, an ethyl group, or a phenyl group. Examples of the substituent include, but not particularly limited to, an amino group, an amide group, an ether group, an ester group, a carbonyl group, a carboxyl group, a hydroxyl group, an alkoxy group, an epoxy group, and a nitrile group.

$R^9$s represent a hydrogen atom, a methyl group, or an ethyl group, and are optionally same with or different from each other. When $R^9$ represents a hydrogen atom, the general formula (5) represents the silanol (silaneol). When $R^9$ represents a methyl group or an ethyl group, the general formula (5) represents the alkoxy group equivalent.

"m" is an integer of $4 \leq m \leq 50$. If "m" is less than 4, which represents a too short silicone chain length, the characteristics of the silicone required in the present application is not sufficiently exhibited. Meanwhile, if "m" is more than 50, the silicone has insufficient compatibility with the aforementioned polysiloxane (A), resulting in a problem of failure to obtain a cured film to yield a uniform surface state.

The polysiloxanediol and/or an alkoxy equivalent thereof of the component (B) may be synthesized by a known method, or a commercially available product may be used. Specific examples of the commercially available product include KF-9701, X-21-3153, X-21-5841, and KF-857, manufactured by Shin-Etsu Chemical Co., Ltd.

The blending ratio between the component (A) and component (B) in the present invention is not particularly limited as long as it yields the desired film, and typically represented by (A)/(B)=1/99 to 99/1 (mass ratio). Although a more preferable blending ratio cannot be unconditionally shown because it differs depending on the molecular weight and content of the alkoxysilyl group of the component (A) and the molecular weight of the component (B), the (A) of 1 or more in the above blending ratio is preferable because film formability becomes sufficient. When the (B) is 1 or more, the characteristics of the silicone derived from the component (B) can be sufficiently obtained, and satisfies the features of the present invention such as bendability of the film and smoothness on the coated surface.

(C) Condensation Curing Catalyst

The condensation curing catalyst (C) according to the present invention is a component that promotes: a hydrolytic condensation reaction of a hydrolysable silyl group such as the alkoxy silyl group and the silanol group included in the organopolysiloxane (A) and in the polysiloxanediol and/or an alkoxy equivalent thereof (B) with moisture in air; and the subsequent dehydrative condensation reaction between the silanol groups, resulting in promoting the curing of the composition. The condensation curing catalyst (C) is added in order to efficiently cure the composition.

The addition amount of the component (C) is not particularly limited, but preferably 0.01 to 50 parts by mass, more preferably 0.05 to 10 parts by mass, and furthermore preferably 0.1 to 5 parts by mass, relative to 100 parts by mass of the total amount of the components (A) and (B) in view of regulating the curing rate within an appropriate range to produce a cured film having a desired physical property, increasing operability during the coating, and economic efficiency of the addition.

The condensation curing catalyst is not particularly limited as long as it is a curing catalyst used for curing a common moisture-condensation-curable composition. Specific examples thereof include: acid compounds, such as a carboxylic acid, hydrochloric acid, sulfuric acid, and phosphoric acid; alkyltin compounds, such as dibutyltin oxide and dioctyltin oxide; alkyltin ester compounds, such as dibutyltin diacetate, dibutyltin dilaurate, dioctyltin dilaurate, dibutyltin dioctoate, dioctyltin dioctoate, and dioctyltin diversatate; titanate esters, such as titanium tetraisopropoxide, titanium tetra-n-butoxide, titanium tetrakis(2-ethylhexoxide), titanium dipropoxide bis(acetylacetonate), titanium diisopropoxide bis(ethylacetoacetate), and titanium isopropoxyoctylene glycol, and titanium chelate compounds and partially hydrolyzed products thereof; organometallic compounds, such as zinc naphthenate, zinc stearate, zinc 2-ethyloctoate, iron 2-ethylhexoate, cobalt 2-ethylhexoate, manganese 2-ethylhexoate, cobalt naphthenate, aluminum trihydroxide, an aluminum alcoholate, an aluminum acylate, a salt of an aluminum acylate, an aluminosiloxy compound, and an aluminum chelate compound; aminoalkyl-group-substituted alkoxysilanes, such as 3-aminopropyltrimethoxysilane, 3-aminopropyltriethoxysilane, 3-aminopropylmethyldimethoxysilane, 3-aminopropylmethyldiethoxysilane, N-β-(aminoethyl)-γ-aminopropyltrimethoxysilane, N-β-(aminoethyl)-γ-aminopropyltriethoxysilane, N-β-(aminoethyl)-γ-aminopropylmethyldimethoxysilane, N-β-(aminoethyl)-γ-aminopropylmethyldiethoxysilane, bis[3-(trimethoxysilyl)propyl]amine, bis[3-(triethoxysilyl)propyl]amine, N,N'-bis[3-(trimethoxysilyl)propyl]ethane-1,2-diamine, N,N'-bis[3-(triethoxysilyl)propyl]ethane-1,2-diamine, and N-phenyl-3-aminopropyltrimethoxysilane; amine compounds, such as hexylamine, dodecylamine phosphate, and tetramethylguanidine, and a salt thereof; quaternary ammonium salts, such as benzyltriethylammonium acetate; lower fatty acid salts of an alkali metal, such as potassium acetate, sodium acetate, and lithium oxalate; dialkylhydroxylamines, such as dimethylhydroxylamine and diethylhydroxylamine; silanes and siloxanes having a guanidyl group, such as tetramethylguanidylpropyltrimethoxysilane, tetramethylguanidylpropylmethyldimethoxysilane, tetramethylguanidylpropyltriethoxysilane, tetramethylguanidylpropylmethyldiethoxysilane, and tetramethylguanidylpropyltris(trimethylsiloxy)silane; and silanes and siloxanes having a phosphazene base, such as N,N,N',N',N",N"-hexamethyl-N'"-[3-(trimethoxysilyl)propyl]phosphorimidic triamide. These catalysts may be used singly, or may be used in combination of two or more kinds thereof.

Among these, preferable are phosphoric acid, titanium tetra-n-butoxide, 3-aminopropyltrimethoxysilane, 3-aminopropyltriethoxysilane, N-β-(aminoethyl)-γ-aminopropyltrimethoxysilane, bis[3-(trimethoxysilyl)propyl]amine, and N,N'-bis[3-(trimethoxysilyl)propyl]ethane-1,2-diamine in terms of balance between the reactivity and a small impact to the environment.

Specific examples of the commercially available component (C) include D-25, D-220, KBM-603, KBE-903, and X-12-5263HP, manufactured by Shin-Etsu Chemical Co., Ltd.

(D) Organic Solvent

The inventive curable coating composition can be used with adding an organic solvent, as necessary, for a purpose of regulating the viscosity to improve the operability and for a purpose of achieving storage stability of the composition. From the viewpoint of regulating the viscosity, one method is emulsification.

Specific examples of usable solvents include: hydrocarbon solvents, such as hexane, heptane, decane, and isododecane; ester solvents, such as ethyl acetate and butyl acetate; and non-reactive volatile silicone solvents, such as decamethylcyclopentasiloxane and permethylpentasiloxane. Any solvent can be used as long as it does not precipitate in the hydrolytic condensation reaction of the silyl group in the inventive curable coating composition and it dissolves the components (A) to (C). Solvents having a lower burden for an operator and environment is more preferable, and isododecane, permethylpentasiloxane, etc. are more preferable.

Other Components

For a purpose of regulating the viscosity of the inventive curable coating composition to improve the operability or a purpose of regulating the curability of the composition, hardness and flexibility of the obtained coating film, etc., one or more compounds selected from silane compounds optionally having an alkoxysilyl group, silicone alkoxy oligomer having an alkoxysilyl group and/or a silanol group in one molecule, and silicone resins are optionally blended in addition to the organopolysiloxane of the component (A) according to the purpose of use.

The silicone alkoxy oligomer having an alkoxysilyl group and/or a silanol group in one molecule is not particularly limited, and commercially available products may be used. Specific examples thereof include X-40-9250, X-40-9246, X-40-9225, KR-500, KR-515, KC-89S, KR-401N, X-40-9227, KR-510, KR-9218, KR-400, X-40-2327, and KR-401, manufactured by Shin-Etsu Chemical Co., Ltd.

The silicone resin is not particularly limited, and commercially available products may be used. Specific examples thereof include KR-220L, KR-251, KR-112, KR-300, KR-311, KR-480, and KR-216, manufactured by Shin-Etsu Chemical Co., Ltd.

Into the inventive curable coating composition, additives such as adhesive modifiers, inorganic or organic ultraviolet ray absorbents, light stabilizers, storage stability modifiers, plasticizers, fillers, and pigments can be added according to the purpose of use.

Curable Coating Composition

The inventive curable coating composition proceeds the hydrolysis reaction of the alkoxysilyl group included in the organopolysiloxane (A) by contacting with moisture in the atmosphere to initiate the crosslinking condensation reaction with the silanol group or alkoxysilyl group included in the silicone (B). As an index of the moisture in the atmosphere, any humidity of 10 to 100% RH may be acceptable, and moisture in air is sufficient therefor. Since a higher humidity typically proceeds the hydrolysis at a higher rate, moisture is optionally added into the atmosphere if necessary.

The temperature and time of the curing reaction can be appropriately changed depending on factors such as a substrate to be used, a moisture concentration, a catalyst concentration, and a kind of hydrolysable group. The time is typically within approximately 1 minute to 1 week at a temperature not exceeding the heat-resistant temperature of the substrate to be used.

The inventive curable coating composition favorably proceeds the curing even at a normal temperature, and eliminates tackiness on the coated surface in several minutes to several hours, especially, even in a case where room temperature curing is essential, such as site fabrication. Although the inventive composition is excellent in operability, a heating treatment may be performed within a range not exceeding the heat-resistant temperature of the substrate.

Article

The present invention also provides an article comprising a cured film of the aforementioned curable coating composition. For the inventive article, a coated solid substrate being a cured article can be obtained by, for example, applying the inventive curable coating composition on a surface of a solid substrate, and curing the applied composition to form a coating layer (cured film).

The applying method is not particularly limited, and can be appropriately selected from known methods to use. Specific examples thereof include spray coating, spin coating, dip coating, roller coating, brush coating, bar coating, and flow coating.

The solid substrate is also not particularly limited. Specific examples thereof include organic polymer substrates, such as: epoxy resins; phenol resins; polycarbonates and polycarbonate blends; acrylic resins, such as poly(methyl methacrylate); polyester resins, such as poly(ethylene terephthalate), poly(butylene terephthalate), and unsaturated polyester resins; polyamide resins; polyimide resins; acrylonitrile-styrene copolymers; styrene-acrylonitrile-butadiene copolymers; polyvinyl chloride resins; polystyrene resins; blends of polystyrene and polyphenylene ether; cellulose acetate butyrate; and polyethylene resins, metal substrates, such as steel plates, paint-coated surfaces, glass, ceramics, concreate, slate plates, textile, woods, stones, tiles, inorganic fillers, such as (hollow) silica, titania, zirconia, and alumina, glass fiber, glass cloth, glass tape, glass mat, and glass paper. The material and shape of the substrate are not particularly limited, but the inventive curable coating composition can be particularly suitably used for coating on a steel plate, a urethane acrylate resin substrate, and glass.

Cosmetics

The inventive curable coating composition can also be used as cosmetics. In particular, the inventive curable coating composition can be suitably used for cosmetics for treating human hair.

EXAMPLE

Hereinafter, the present invention will be specifically described by using Examples and Comparative Examples, but the present invention is not limited thereto.

In the below, the kinematic viscosity of each product was a value measured at 25° C. with a Cannon-Fenske viscometer in accordance with a method described in JIS Z 8803: 2011. The molecular weight was a weight average molecular weight in terms of polystyrene and determined through GPC measurement using a gel permeation chromatography (GPC) instrument manufactured by Tosoh Corporation, tetrahydrofuran (THF) as a solvent, and an RI as a detector.

An average composition of a silicone was calculated from integrated values of detected spectra of $^{1}$H-NMR and $^{29}$Si-NMR, using a 300 MHz-NMR measurement instrument manufactured by JEOL Ltd.

The content of the silanol-type hydroxy group included in each product (mass %, described as "silanol amount" hereinafter) was quantified from the amount of generated methane gas when a Grignard reagent (methylmagnesium iodide) was reacted with each product.

Used in the present Examples and Comparative Examples as the component (A), manufactured by Shin-Etsu Chemical Co., Ltd., were: silicone A-1: in the general formula (1), $R^1$ represents a methyl group, $R^2$ represents a triethoxysilylethyl group, $R^3$ represents a dimethylpolysiloxysilylethyl group (in the general formula (4), y=8 [averaged value]), "a" is 1.82, "b" is 0.06, and "c" is 0.24, the kinematic viscosity at 25° C. is 57 mm$^2$/s, and the weight average molecular weight is 4,400; silicone A-2: in the general formula (1), $R^1$ represents a methyl group and a dodecyl group (methyl group:dodecyl group=21:2 (mole ratio)), $R^2$ represents a triethoxysilylethyl group, $R^3$ represents a dimethylpolysiloxysilylethyl group (in the general formula (4), y=8 [averaged value]), "a" is 1.92, "b" is 0.08, "c" is 0.17, and the kinematic viscosity at 25° C. is 48 mm$^2$/s, and the weight average molecular weight is 2,900; and silicone A-3: in the general formula (1), $R^1$ represents a methyl group and an organic group represented by the general formula (2) (in the general formula (2), "d" is 3, "e" is 0, "f" is 3, and $R^4$ represents an octadecyl group, and methyl group:the organic group represented by the general formula (2)=31:1 (mole ratio)), $R^2$ represents a triethoxysilylethyl group, $R^3$ represents a dimethylpolysiloxysilylethyl group (in the general formula (4), y=8 [averaged value]), "a" is 1.88, "b" is 0.06, "c" is 0.18, the kinematic viscosity at 25° C. is 61 mm$^2$/s, and the weight average molecular weight is 4,080.

Used in the present Examples and Comparative Examples as the component (B), manufactured by Shin-Etsu Chemical Co., Ltd., were: silicone B-1: in the general formula (5), $R^8$ represents a methyl group, $R^9$ represents a hydrogen atom, and "m" is 40, the kinematic viscosity at 25° C. is 60 mm$^2$/s, and the silanol amount is 1,500 g/mol; and silicone B-2: in the general formula (5), $R^8$ represents a methyl group, $R^9$ represents a hydrogen atom, and "m" is 13, the kinematic viscosity at 25° C. is 30 mm$^2$/s and the silanol amount is 500 g/mol.

Used in the present Examples and Comparative Examples as the component (C) were: titanium tetrabutoxide; a solution of phosphoric acid in 2-propanol (solid content 24.9%); and 3-aminopropyltriethoxysilane (KBE-903, manufactured by Shin-Etsu Chemical Co., Ltd.). As the component (D), isododecane was used.

The aforementioned (A) to (D) were used to prepare each coating composition with the formulation in Table 1.

TABLE 1

| | | Example 1 | Example 2 | Example 3 | Example 4 | Example 5 | Example 6 | Example 7 | Example 8 | Example 9 | Comparative Example 1 | Comparative Example 2 |
|---|---|---|---|---|---|---|---|---|---|---|---|---|
| Component (A) | Silicone A-1 | 65 | 65 | 65 | 65 | | | 65 | | 35 | 65 | 100 |

TABLE 1-continued

| | | Example 1 | Example 2 | Example 3 | Example 4 | Example 5 | Example 6 | Example 7 | Example 8 | Example 9 | Comparative Example 1 | Comparative Example 2 |
|---|---|---|---|---|---|---|---|---|---|---|---|---|
| | Silicone A-2 | | | | | 65 | | | 65 | | | |
| | Silicone A-3 | | | | | | 65 | | | | | |
| Component (B) | Silicone B-1 | 35 | 35 | 35 | 35 | 35 | 35 | | | 65 | 35 | |
| | Silicone B-2 | | | | | | | 35 | 35 | | | |
| Component (C) | TBT | 2 | | | 2 | 2 | 2 | 2 | 2 | 2 | | 2 |
| | PA/IPA | | 2 | | | | | | | | | |
| | KBE-903 | | | 2 | 1 | | | | | | | |
| Component (D) | Isododecane | 200 | 200 | 200 | 200 | 200 | 200 | 200 | 200 | 200 | 200 | 200 |

TBT: Titanium tetrabutoxide
PA/IPA: Solution of phosphoric acid in 2-propanol (solid content 24.9%)
KBE-903: 3-Aminopropyltriethoxysilane As a comparative example, a room-temperature curable coating agent KR-400 (methyl-type silicone alkoxy oligomer), manufactured by Shin-Etsu Chemical Co., Ltd., was used as Comparative Example 3. A composition in which 2% of titanium tetrabutoxide was blended as a curing catalyst with X-40-9246 (methyl-type silicone alkoxy oligomer) being a flexibility-imparted grade, manufactured by the same, was used as Comparative Example 4.

The coating compositions obtained in Examples and Comparative Examples were applied on a glass plate with 2 mm in thickness or a polished steel plate with 0.5 mm in thickness at 25° C. under air with 50% RH by using a bar coater No. 14, the applied film was dried and cured at 25° C. under air with 50% RH for one day to form a cured film. The following evaluation was performed for the cured films. Tables 2 and 3 show these results.

Pencil Hardness

A specimen in which the cured film was formed on a glass plate with 2 mm in thickness was measured by applying 750 g of a load in accordance with a pencil scratch test described in JIS K 5600-5-4:1999. The results are shown.

Bending Resistance

On a specimen in which the cured film was formed on a polished steel plate with 0.5 mm in thickness, bending resistance was measured in accordance with a method described in JIS K 5600-5-1:1999 by using cylindrical mandrel (type 1). The results are shown.

Finger-Touch Smoothness

A specimen in which the cured film was formed on a polished steel plate was touched so as to be wiped with non-woven fabric to determine smoothness on the surface with the following criteria.

Smooth A
Slightly smooth B
Not smooth C

TABLE 2

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Pencil hardness | 2H | 2H | 2H | 2H | 1H | 3H | 2H | 3H | 3H |
| Bending resistance (mmϕ) | ≤2 | ≤2 | ≤2 | ≤2 | ≤2 | ≤2 | ≤2 | ≤2 | ≤2 |
| Finger-touch smoothness | A | A | A | A | A | A | A | A | A |

TABLE 3

| | Comp. Ex. 1 | Comp. Ex. 2 | Comp. Ex. 3 | Comp. Ex. 4 |
|---|---|---|---|---|
| Pencil hardness | Not cured | F | 5H | HB |
| Bending resistance (mmϕ) | and unevaluable | 4 | 8 | 6 |
| Finger-touch smoothness | | A | C | B |

As shown in Tables 2 and 3, it is found that the cured film obtained in Examples can achieve all of the hardness, the bending resistance, and the surface smoothness compared with the cured film obtained in Comparative Examples. Meanwhile, the cured film produced in Comparative Example 1 did not sufficiently proceed the curing, and failed to obtain a practically satisfactory film. Comparative Example 2, added with no component (B), failed to obtain good bending resistance. Comparative Examples 3 and 4 used the silicone alkoxy oligomer having an alkoxy silyl group and/or a silanol group in one molecule, which was used as another component in the present invention, and thereby also failed to obtain sufficient bending resistance and finger-touch smoothness.

Next, the compositions of Examples 1, 4, 5, and 7 and Comparative Examples 1 to 4 were diluted with decamethylcyclopentasiloxane so that the film-forming component was 10 wt %, and a hair bundle for test (length 6 cm) subjected to a bleaching treatment with a bleaching agent was coat-treated therewith so that 1 g of the liquid was applied on 1 g of the hair bundle.

After sufficient coating, an extra liquid was squeezed with fingers, the hair bundle was dried with a hair dryer with combing, and curability of the film was evaluated. Then, the hair bundle was allowed to be cooled at a room temperature for 1 hour, and then subjected to continuous 20 cycles of shampooing and washing with water repeatedly. On the hair bundle immediately after the treatment and the hair bundle after the continuous 20-cycle treatment, characteristics such as combing capability, softness, and glossiness were observed and evaluated with comparing untreated normal hair.

Five skilled panelists observed the characteristics, and scored in accordance with the criteria shown in Table 4 to specify an arithmetical average point thereof as the evaluation score.

TABLE 4

| | Curability | Combing capability | Softness | Glossiness |
|---|---|---|---|---|
| 5 points | Good | | Present | |
| 4 points | Slightly good | | Slightly present | |
| 3 points | Average | | Average | |
| 2 points | Slightly poor | | Slightly absent | |
| 1 point | Poor | | Absent | |

The obtained average point was judged as A to E in accordance with the following criteria.

Judgement of Average Point:

The obtained average point was 4.5 or more A

The obtained average point was 3.5 or more and less than 4.5 B

The obtained average point was 2.5 or more and less than 3.5 C

The obtained average point was 1.5 or more and less than 2.5 D

The obtained average point was less than 1.5 E

Table 5 shows the judged results of the curability, combing capability, softness, and glossiness.

TABLE 5

| | | Ex. 1 | Ex. 4 | Ex. 5 | Ex. 7 | Comp. Ex. 1 | Comp. Ex. 2 | Comp. Ex. 3 | Comp. Ex. 4 |
|---|---|---|---|---|---|---|---|---|---|
| Curability | | A | A | A | A | E | D | A | A |
| Immediately after treatment | Combing capability | A | A | A | A | B | C | D | C |
| | Softness | A | A | A | A | C | C | E | C |
| | Glossiness | A | A | A | A | B | C | E | D |
| After continuous 20-cycle treatment | Combing capability | A | A | A | A | D | D | D | D |
| | Softness | A | A | A | A | D | D | E | E |
| | Glossiness | A | A | A | A | D | D | E | D |

As shown in Table 5, the inventive coating compositions of Examples 1, 4, 5, and 7 all exhibited good curability (high film strength), and good combing capability (surface lubricity), softness, and glossiness immediately after the treatment. Furthermore, these characteristics were good even after the continuous 20-cycle treatment. Meanwhile, Comparative Examples 1 and 2 exhibited insufficient curability, insufficient combing capability, softness, and glossiness even immediately after the treatment, and the characteristics became worse by the continuous 20-cycle treatment. Comparative Examples 3 and 4 exhibited sufficient curability, but insufficient combing capability, softness, and glossiness even immediately after the treatment, and in Comparative Example 4, the characteristics became worse by the continuous 20-cycle treatment.

It should be noted that the present invention is not limited to the above-described embodiments. The embodiments are just examples, and any examples that substantially have the same feature and demonstrate the same functions and effects as those in the technical concept disclosed in claims of the present invention are included in the technical scope of the present invention.

The invention claimed is:

1. A curable coating composition comprising the following components (A) to (C):

(A) an organopolysiloxane represented by the following general formula (1), $$R^1_aR^2_bR^3_cSiO_{(4-a-b-c)/2} \quad (1)$$

wherein $R^1$ represents an organic group selected from a group consisting of an alkyl group having 1 to 30 carbon atoms, a cycloalkyl group having 5 to 10 carbon atoms, an aryl group having 6 to 10 carbon atoms, an aralkyl group having 7 to 14 carbon atoms, a fluorine-substituted alkyl group having 3 to 10 carbon atoms, and an organic group represented by the following general formula (2), $$-C_dH_{2d}-O-(C_2H_4O)_e-(C_3H_6O)_f-R^4 \quad (2)$$

wherein $R^4$ represents an alkyl group having 1 to 30 carbon atoms or an acyl group having 1 to 30 carbon atoms; "d" is an integer of $0 \le d \le 15$, "e" is an integer of $0 \le e \le 50$, and "f" is an integer of $0 \le f \le 50$, wherein $R^2$ represents a group represented by the following general formula (3),

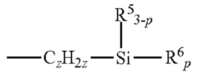

(3)

wherein $R^5$ represents a group selected from a group consisting of an alkyl group having 1 to 6 carbon atoms, a cycloalkyl group having 5 to 6 carbon atoms, and a phenyl group; $R^6$ represents an alkoxy group having 1 to 6 carbon atoms; "z" is an integer of 2 to 8; and "p" is an integer of 1 to 3, wherein $R^3$ represents a silicone compound residue represented by the following general formula (4), (4)

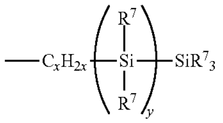

wherein $R^7$ independently represents a group selected from a group consisting of an alkyl group having 1 to 30 carbon atoms, a cycloalkyl group having 5 to 10 carbon atoms, an aryl group having 6 to 10 carbon atoms, an aralkyl group having 7 to 14 carbon atoms, and a fluorine-substituted alkyl group having 3 to 10 carbon atoms; "x" is an integer of $1 \leq x \leq 5$; and "y" is an integer of $0 \leq y \leq 500$, wherein when a plurality of the $R^1$ to $R^7$ are contained in a molecule, the $R^1$ to $R^7$ are optionally the same with or different from each other; "a" is a number of $1.0 \leq a \leq 2.5$; "b" is a number of $0.001 \leq b \leq 1.5$; and "c" is a number of $0.001 \leq c \leq 1.5$;

(B) a polysiloxanediol represented by the following general formula (5) and/or an alkoxy equivalent thereof, (5)

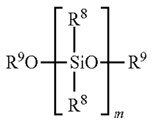

wherein $R^8$ independently represents a group selected from a group consisting of an alkyl group having 1 to 30 carbon atoms, a cycloalkyl group having 5 to 10 carbon atoms, an aryl group having 6 to 10 carbon atoms, an aralkyl group having 7 to 14 carbon atoms, and a fluorine-substituted alkyl group having 3 to 10 carbon atoms, each of which optionally has a substituent; $R^9$ independently represents a hydrogen atom, a methyl group, or an ethyl group; and "m" is an integer of $4 \leq m \leq 50$; and (C) a condensation curing catalyst.

2. The curable coating composition according to claim 1, wherein a weight average molecular weight of the component (A) measured in terms of polystyrene by gel permeation chromatography is 300 to 100,000.

3. The curable coating composition according to claim 1, wherein the component (C) is one or more kinds selected from a group consisting of an acid catalyst, an amine compound and a salt thereof, an aminoalkyl-group-substituted alkoxysilane, and an aluminum-based, titanium-based, and tin-based organometallic catalyst.

4. The curable coating composition according to claim 2, wherein the component (C) is one or more kinds selected from a group consisting of an acid catalyst, an amine compound and a salt thereof, an aminoalkyl-group-substituted alkoxysilane, and an aluminum-based, titanium-based, and tin-based organometallic catalyst.

5. The curable coating composition according to claim 1, further comprising (D) an organic solvent.

6. The curable coating composition according to claim 2, further comprising (D) an organic solvent.

7. The curable coating composition according to claim 3, further comprising (D) an organic solvent.

8. The curable coating composition according to claim 4, further comprising (D) an organic solvent.

9. An article having a cured film of the curable coating composition according to claim 1.

10. An article having a cured film of the curable coating composition according to claim 2.

11. An article having a cured film of the curable coating composition according to claim 3.

12. An article having a cured film of the curable coating composition according to claim 4.

13. An article having a cured film of the curable coating composition according to claim 5.

14. An article having a cured film of the curable coating composition according to claim 6.

15. An article having a cured film of the curable coating composition according to claim 7.

16. An article having a cured film of the curable coating composition according to claim 8.

* * * * *